United States Patent [19]

Ishikawa et al.

[11] Patent Number: 5,560,253

[45] Date of Patent: Oct. 1, 1996

[54] SHIFT LEVER ASSEMBLY FOR MANUAL TRANSMISSION

[75] Inventors: Koichi Ishikawa; Michiyuki Murakami; Yoshitaka Sogo; Mitsuyuki Hasegawa, all of Kariya, Japan

[73] Assignee: Tsuda Kogyo Kabushiki Kaisha, Japan

[21] Appl. No.: 471,273

[22] Filed: Jun. 6, 1995

[30] Foreign Application Priority Data

Oct. 13, 1994 [JP] Japan .................................. 6-247739
Oct. 20, 1994 [JP] Japan .................................. 6-255433

[51] Int. Cl.$^6$ ................................................ F16H 59/04
[52] U.S. Cl. ......................... 74/473 R; 74/566; 403/50; 403/330
[58] Field of Search ................................ 74/473 R, 566; 403/50, 330

[56] References Cited

U.S. PATENT DOCUMENTS

| | | | |
|---|---|---|---|
| 4,630,500 | 12/1986 | Suzuki | 74/473 R |
| 4,817,968 | 4/1989 | Fischle | 74/566 X |
| 4,879,922 | 11/1989 | Suzuki | 74/473 R X |
| 5,129,278 | 7/1992 | Nakao | 74/471 XY X |

*Primary Examiner*—Allan D. Herrmann
*Attorney, Agent, or Firm*—Dennison, Meserole, Pollack & Scheiner

[57] ABSTRACT

A shift lever assembly for a manual transmission is disclosed. A boss of a shifting lever is supported for rotation by a shift shaft on a lever retainer. A boss of a selecting lever is supported for rotation by a support shaft parallel to the shift shaft on the lever retainer. A boss of a shift lever is supported for selecting operation about a select shaft at right angles to the shift shaft on the shifting lever. Shifting operation of the shift lever is transmitted via a select arm and an end ball portion thereof to an engagement portion of the selecting lever to cause rotation of the selecting lever about the axis of the support shaft. The shift lever is formed integrally with its boss, the select arm and the ball portion.

9 Claims, 12 Drawing Sheets

SHIFT LEVER ASSEMBLY FOR MANUAL TRANSMISSION

BACKGROUND OF THE INVENTION

1. Field of the Invention

This invention relates to shift lever assemblies for automotive manual transmissions.

2. Description of the Related Art

The shift lever assemblies for manual transmissions are of various types. For example, the applicant has proposed a shift lever assembly having a construction as shown in the specification and drawings of Japanese Patent Application No. 5-283395. This application has not yet been laid open to public, and the proposed shift lever assembly is not a prior art.

FIG. 9 shows, in perspective view, a shift lever assembly having the same construction as in the technique shown in the specification and drawings mentioned above. The illustrated shift lever assembly has a lever retainer 80 which is mounted on a floor of a vehicle. A shift lever 82 is supported for shifting operation and also for selecting operation on the lever retainer 80. In this specification, operation in X directions is referred to as shifting operation, and operation in Y directions is referred to as selecting operation.

The shift lever 82 is capable of the shifting operation together with a shifting lever 84 relative to the lever retainer 80 about a shift shaft 86. In addition, the shift lever 82 is capable of the shifting operation relative to the shifting lever 84 about the axis of a select lever 88 which extends at right angles to the shift shaft 86. When selecting operation of the shift lever 82 is caused, a selecting lever 92 is rotated relative to the lever retainer 80 about the axis of a support shaft 94 parallel to the shift shaft 86 via a select arm 89 and a ball 90 at an end of the select arm 89.

With the shift lever 82, the lower end thereof and a boss 82a which is supported for rotation on the select shaft 88, the boss 82a and the select arm 89, and further the select arm 89 and the ball 90, are coupled to one another by welding or crimping. In addition, with the shifting lever 84, the upper end thereof and a boss 84a supported for rotation on the shift shaft 86, and the boss 84a and the select shaft 88, are coupled to one another by welding or crimping. The selecting lever 92 and the support shaft 94 therefor are made integral with each other by pressure fitting or like means.

Thus, the illustrated shift lever assembly comprises a large number of components. In addition, its assembling involves a large number of steps because of use of such means as welding, crimping and pressure fitting for coupling the predetermined components to one another, and therefore requires long assembling time.

SUMMARY OF THE INVENTION

An object of the invention is to reduce the number of components of the shift lever assembly, thus reducing the number of assembling steps and also reducing the assembling time.

To attain this object, the shift lever assembly for a manual transmission according to the invention has the following constructions.

The shift lever assembly for a manual transmission according to a first aspect of the invention comprises a lever retainer, a shifting lever having a boss supported for rotation by a shift shaft with respect to the lever retainer, a selecting lever having a boss supported for rotation by a support shaft parallel to the shift shaft with respect to the lever retainer, and a shift lever having a boss supported for selecting operation about a select shaft at right angles to the shift shaft with respect to the shifting lever, the selecting operation of the shift lever being transmitted via a select arm and an end ball portion thereof to an engagement portion of the selecting lever to cause rotation of the selecting lever about the axis of the support shaft, the shift lever being formed integrally with its boss, the select arm and the ball portion.

The shift lever assembly for a manual transmission according to a second aspect of the invention comprises a lever retainer, a shifting lever having a boss supported for rotation by a shift shaft with respect to the lever retainer, a selecting lever having a boss supported for rotation by a support shaft parallel to the shift shaft with respect to the lever retainer, and a shift lever having a boss supported for selecting operation about a select shaft at right angles to the shift shaft with respect to the shifting lever, the selecting operation of the shift lever being transmitted via a select arm and an end ball portion thereof to an engagement portion of the selecting lever to cause rotation of the selecting lever about the axis of the support shaft, the shifting lever being formed integrally with its boss and also with the select shaft.

The shift lever assembly for a manual transmission according to a third aspect of the invention comprises a lever retainer, a shifting lever having a boss supported for rotation by a shift shaft with respect to the lever retainer, a selecting lever having a boss supported for rotation by a support shaft parallel to the shift shaft with respect to the lever retainer, and a shift lever having a boss supported for selecting operation about a select shaft at right angles to the shift shaft with respect to the shifting lever, the selecting operation of the shift lever being transmitted via a select arm and an end ball portion thereof to an engagement portion of the selecting lever to cause rotation of the selecting lever about the axis of the support shaft, the selecting lever being formed integrally with its boss, the support shaft and the engagement portion.

With the above constructions, in which the shift lever and a part associated therewith, or the shifting lever and a part associated therewith, or the selecting lever and a part associated therewith are integral with each other, the number of components of the shift lever assembly is reduced, and also the assembling thereof is simplified.

The above and other objects, features and advantages of the invention will become more apparent from the detailed description of the preferred embodiments given hereinunder when the same is read with reference to the accompanying drawings.

DETAILED DESCRIPTION OF THE PREFERRED EMBODIMENTS

Preferred embodiments of the invention will now be described. A first embodiment will first be described with reference to FIGS. 1 to 8.

Figure 1:
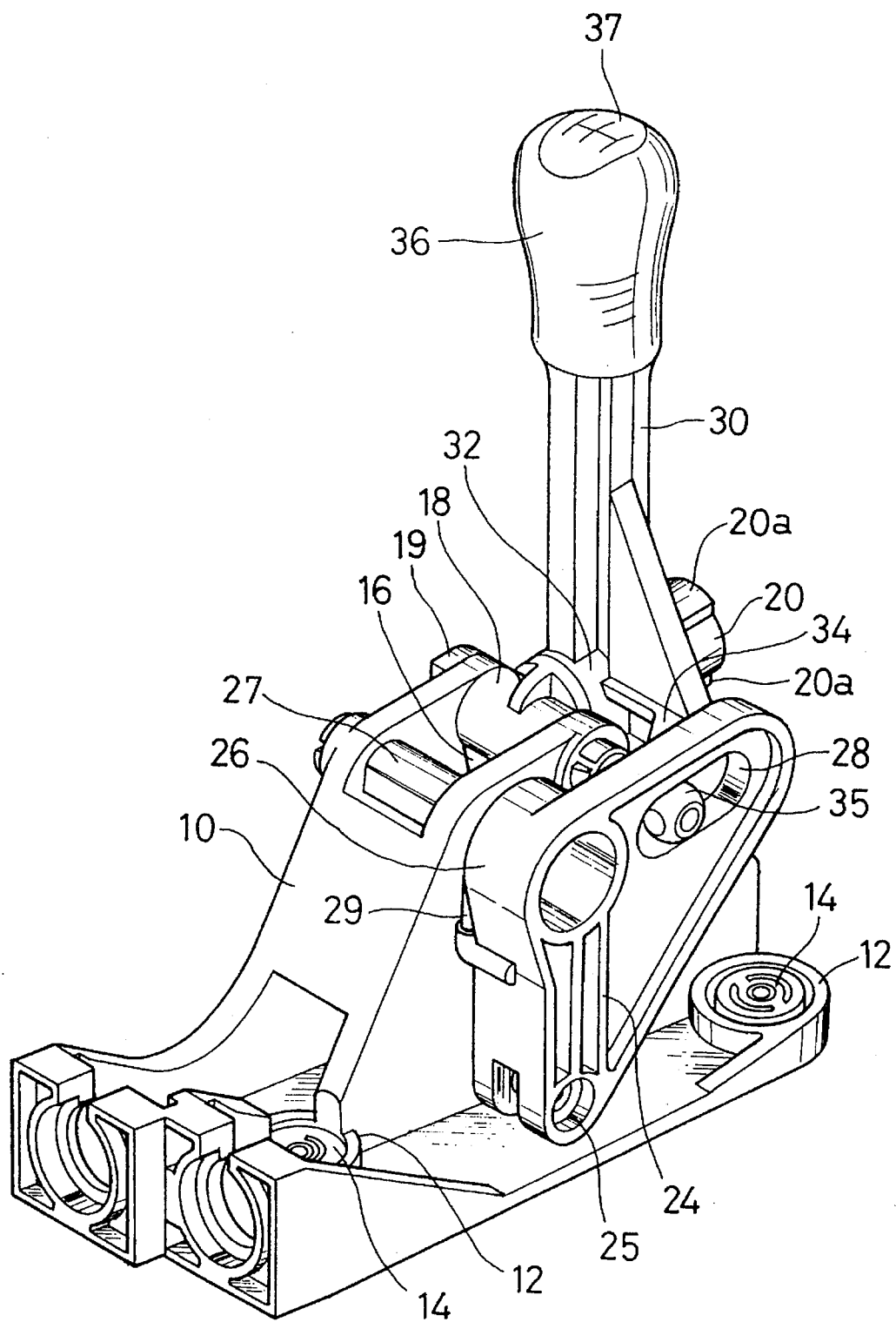
FIG. 1 is a perspective view showing a shift lever assembly for a manual transmission according to a first embodiment of the invention.
Figure 2:
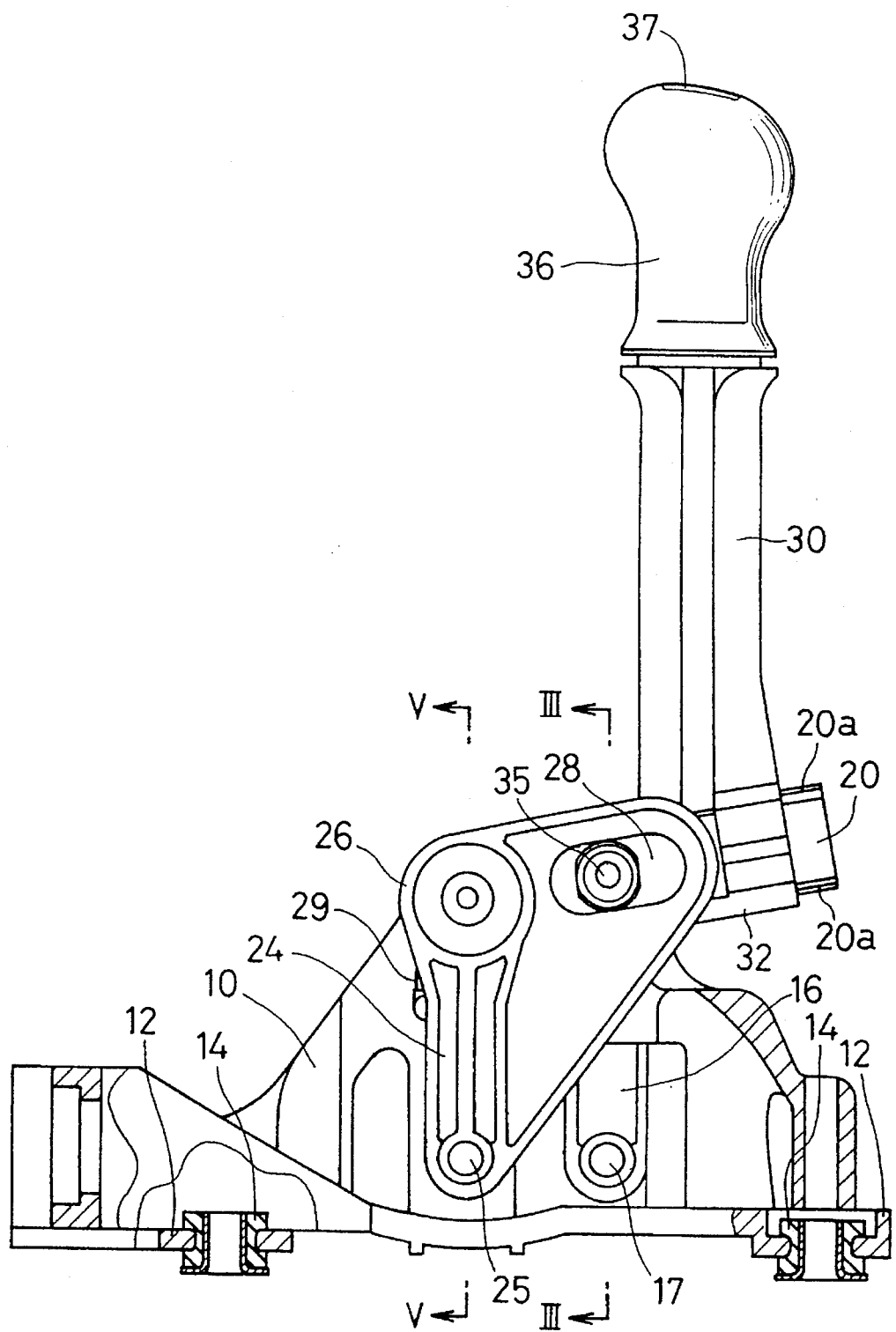
FIG. 2 is a side view showing the shift lever assembly of the first embodiment.

FIG. 1 shows, in perspective view, a shift lever assembly for a manual transmission according to the first embodiment. FIG. 2 shows the same shift lever assembly in side view. Referring to these drawings, the illustrated shift lever assembly has a lever retainer 10. The lever retainer 10 has a plurality of (i.e., three in this instance) mounting portions 12 which are mounted by bolts (not shown) via vibration-proof bushes 14 on the floor of a vehicle. A shift lever 30 is assembled onto the lever retainer 10 for shifting operation and also for selecting operation. The shift lever 30 has an integral lever knob 36 at its upper end. The lever knob 36 has its surface provided with a shift pattern 37 of the shift lever 30, as clearly shown in FIG. 1.

Figure 3:
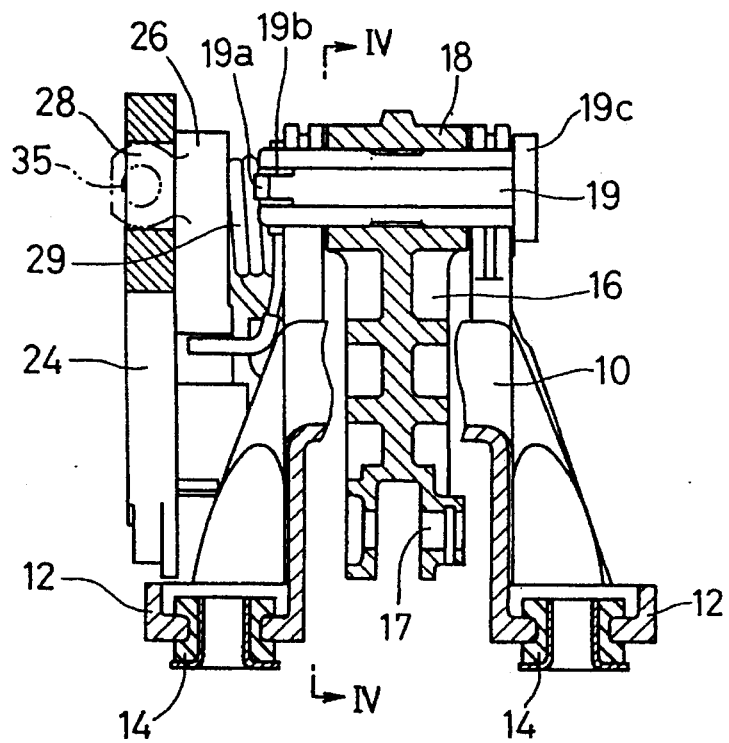
FIG. 3 is a sectional view taken along line III—III in FIG. 2.
Figure 4:
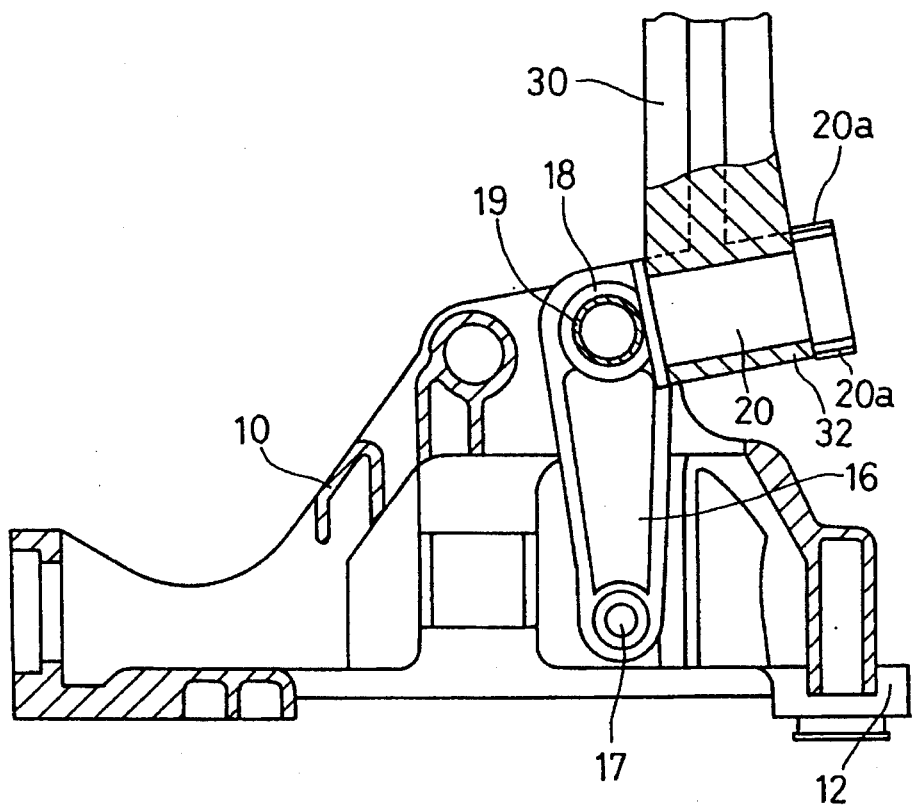
FIG. 4 is a sectional view taken along line IV—IV in FIG. 3.
Figure 5:
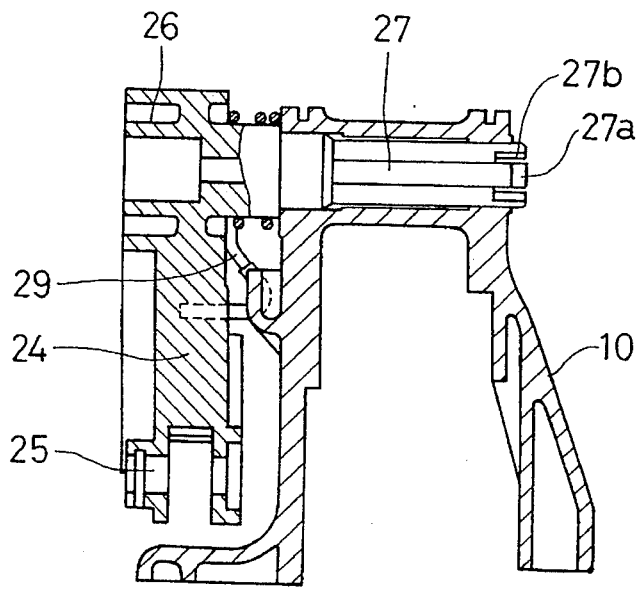
FIG. 5 is a sectional view taken along line V—V in FIG. 2.

FIG. 3 is a sectional view taken along line III—III in FIG. 2. FIG. 4 is a sectional view taken along line IV—IV in FIG. 3. FIG. 5 is a sectional view taken along line V—V in FIG. 2. As clearly shown in FIGS. 3 and 4, a shifting lever 16 has an upper end boss 18 which is supported for rotation by a shift shaft 19 on the lever retainer 10. The shifting lever 16 has a coupling hole 17 formed adjacent to its lower end for coupling an end of a shifting cable (not shown).

As clearly shown in FIGS. 1, 2 and 5, a selecting lever 24 has a boss 26 supported for rotation by a support shaft 27 parallel to the shift shaft 19 on the lever retainer 10. The selecting lever 24 includes a lower end portion extending from the boss 26 and having a coupling hole 25 for coupling an end of a selecting cable (not shown). The selecting lever 24 also includes a rear end portion extending from the boss 26 and having an engagement hole or opening 28.

As shown in FIG. 4, the boss 18 of the shifting lever 16 has a select shaft 20 extending substantially at right angles to the shift shaft 19. The shift lever 30 has a lower end boss 32 which is supported for rotation on the select shaft 20. As shown in FIG. 1, the boss 32 has an L-shaped select arm 34 extending sidewise. The select arm 34 has a ball portion 35 formed at its end. The ball portion 35 is in spherical surface contact with the surface of the engagement hole 28 formed in the selecting lever 24.

With rotating operation (i.e., shifting operation) of the shift lever 30 together with the shifting lever 16 about the shift shaft 19, a shifting operation force is transmitted via the shifting cable noted above to the transmission. On the other hand, with rotating operation (i.e., selecting operation) of the shift lever 30 about the select shaft 20, the selecting lever 24 is rotated about the axis of the support shaft 27 in an interlocked relation to movement of the select arm 34 and the end ball portion 35 thereof. As a result, a selecting operation force is transmitted via the selecting cable noted above to the transmission.

As shown in FIGS. 3 and 5, a select return spring 29 is assembled onto the support shaft 27 supporting the selecting lever 24. The spring 29 provides a biasing force tending to return the selecting lever 24, and hence the shift lever 30, to a neutral position in the selecting operation.

Figure 6:
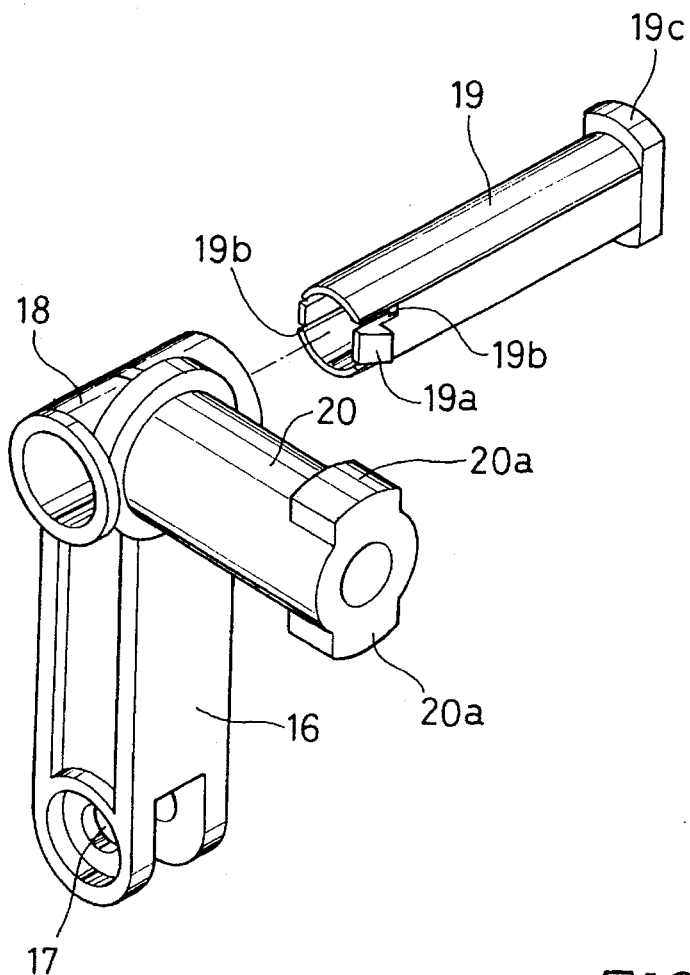
FIG. 6 is a perspective view showing a shifting lever and a shift shaft.

FIG. 6 shows, in perspective view, the shifting lever 16 together with the shift shaft 19. As shown, the shift shaft 19 is cylindrical. It is made of a synthetic resin or like material. The shift shaft 19 has a pair of pawls 19a formed at one end and a flange 19c formed at the other end. The shift shaft 19 also has slits 19b which permit flexing of its portions with the pawls 19a toward its axis.

The shift shaft 19 thus can be inserted from its end with the pawls 19a through a support hole (not shown) of the lever retainer 10 and the boss 18 of the shifting lever 16. When the forward end of the shift shaft 19 protrudes from the opposite side of the lever retainer 10, the pawls 19a are click engaged with the lever retainer 10. The shift shaft 19 thus is click retained in the lever retainer 10 against detachment.

As shown in FIG. 6, the shifting lever 16, the boss 18 and the select shaft 20 are formed together as a one-piece molding of a synthetic resin or like material. The select shaft 20 is again cylindrical and has a pair of integral raised portions 20a projecting outward from its end. These raised portions 20a can be axially passed through recesses 32a formed in the inner periphery of the boss 32 of the shift lever 30 to be described later.

Figure 7:
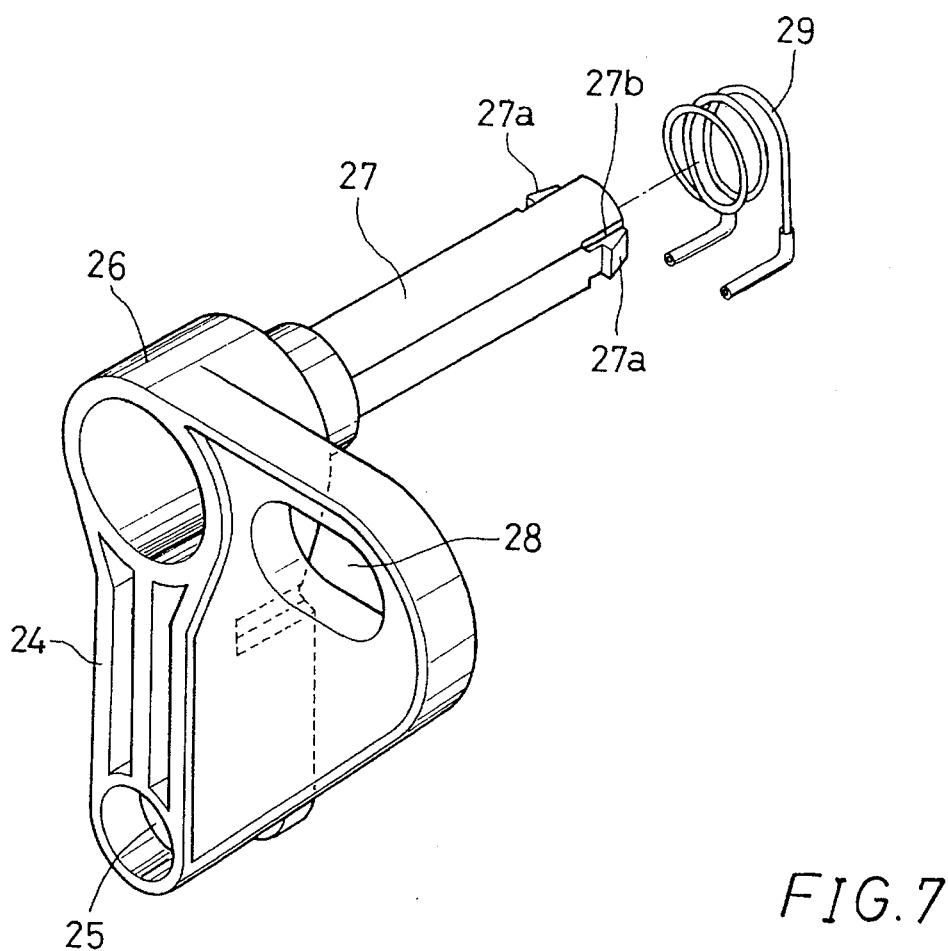
FIG. 7 is a perspective view showing a selecting lever.

FIG. 7 shows the selecting lever 24 in perspective view. As shown, the selecting lever 24 is formed together with the support shaft 27 and the portion having the engagement hole 28 as one-piece molding of a synthetic resin or like material. The support shaft 27 is cylindrical and has a pair of integral pawls 27a formed at its end. The support shaft 27 also has slits 27b which permit flexing of its portions with the pawls 27a toward its axis.

Thus, after assembling the select return spring 29 to its outer periphery, the support shaft 27 can be inserted from its end with the pawls 27a through a support hole (not shown) in the lever retainer 10. When the forward end of the inserted support shaft 27 protrudes from the opposite side of the lever retainer 10, the pawls 27a are click engaged with the lever retainer 10. Thus, the support shaft 27 is click engaged with the lever retainer 10 against detachment.

Figure 8:
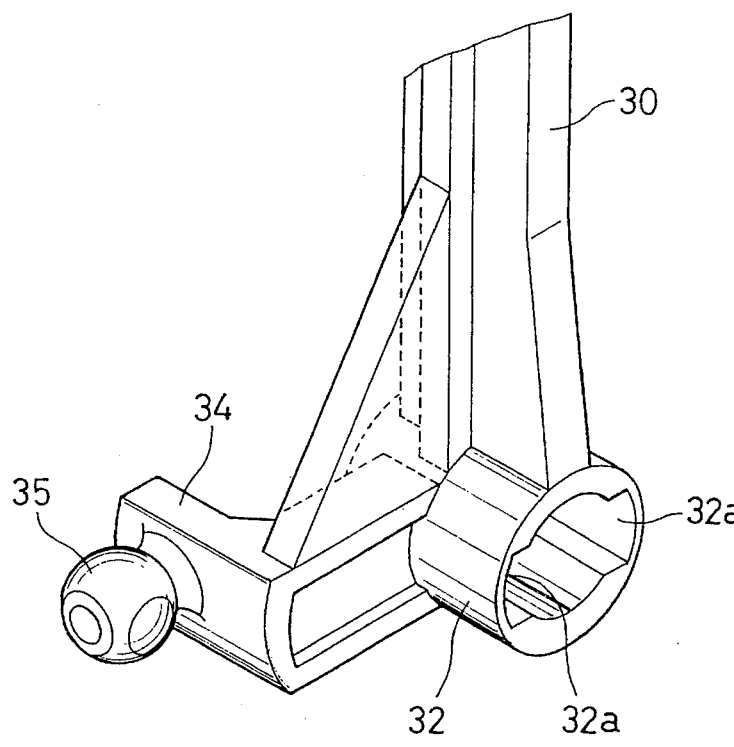
FIG. 8 is a perspective view showing part of a shift lever.
Figure 9:
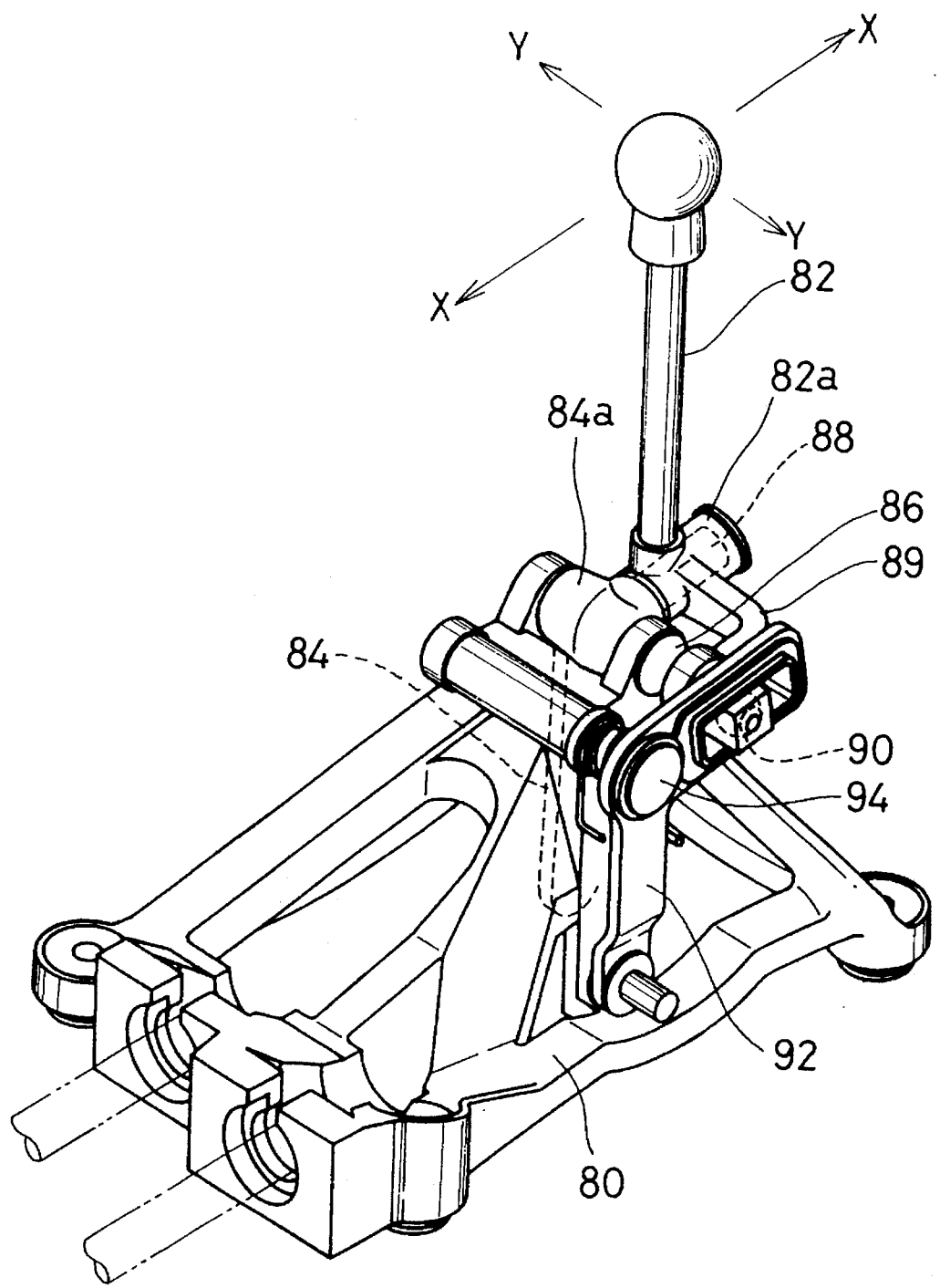
FIG. 9 is a perspective view showing a prior art shift lever assembly for a manual transmission.

FIG. 8 shows part of the shift lever 30 in perspective view. As shown, the shift lever 30 is formed together with the select arm 34 and the ball portion 35 as one-piece molding of a synthetic resin or like material. The boss 32 has its inner periphery formed with a pair of recesses 32a through which the raised portions 20a of the select shaft 20 can be passed as described above.

The positions of the raised portions 20a and the recesses 32a are deviated by about 90 degrees from one another in a state that the boss 32 of the shift lever 30 is regularly supported on the select shaft 20. That is, once the select shaft 20 and the boss 32 of the shift lever 30 are coupled regularly such that the raised portions 20a and the recesses 32a are in the predetermined position relation as noted above, the two components are retained against detachment from each other irrespective of the selecting operation of the shift lever 30.

As has been shown, with the shift lever assembly of this embodiment, it is possible to reduce the number of components, thus permitting the reduction of the number of assembling steps, assembling time and cost of assembling.

Now, a second embodiment of the invention will be described with reference to FIGS. 10 to 14. Parts that are the same or equivalent to those of the preceding first embodiment are given like reference numerals, and their description will sometimes not be repeated.

Figure 10:
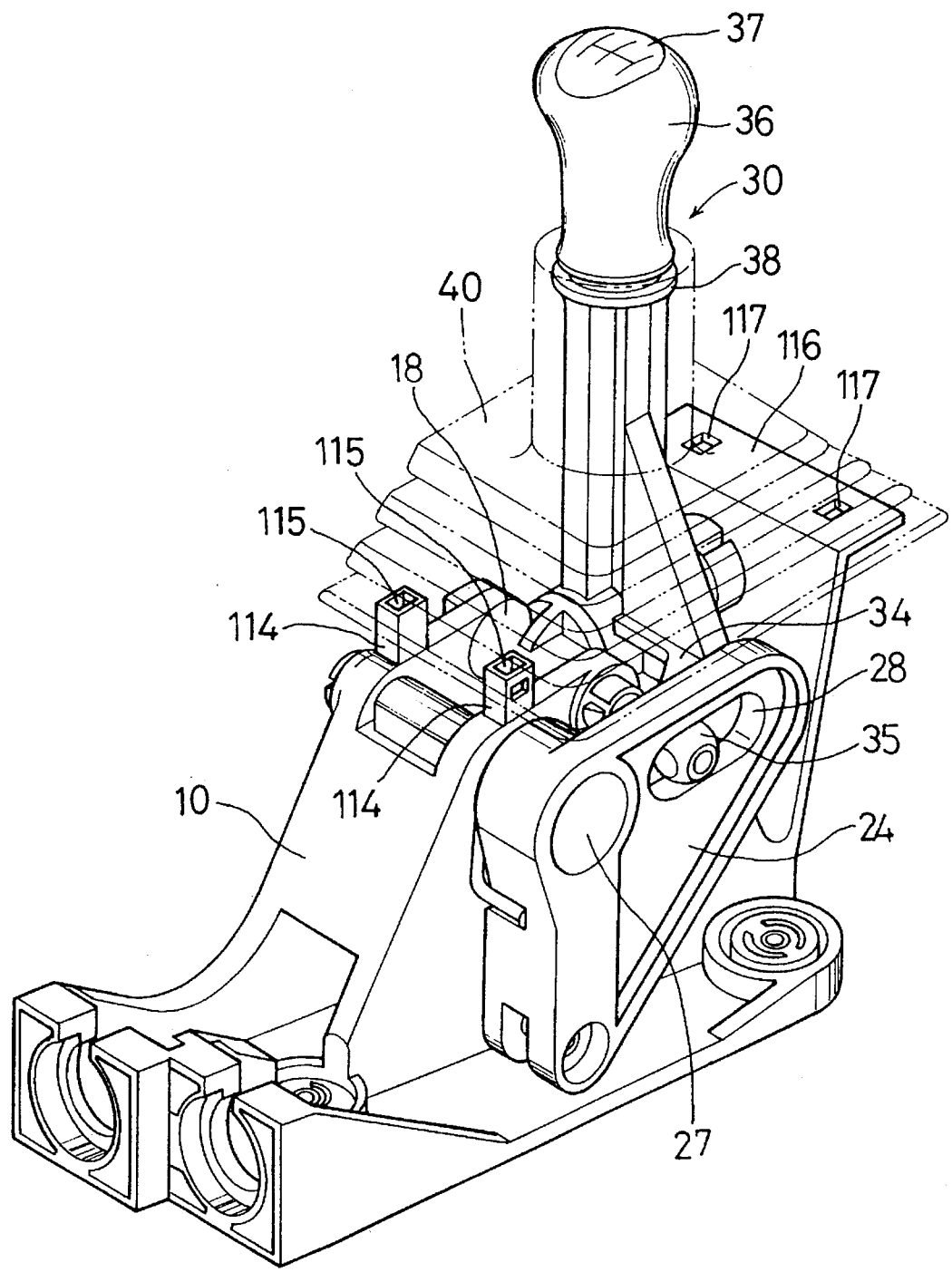
FIG. 10 is a perspective view showing a shift lever assembly for a manual transmission according to a second embodiment of the invention.
Figure 11:
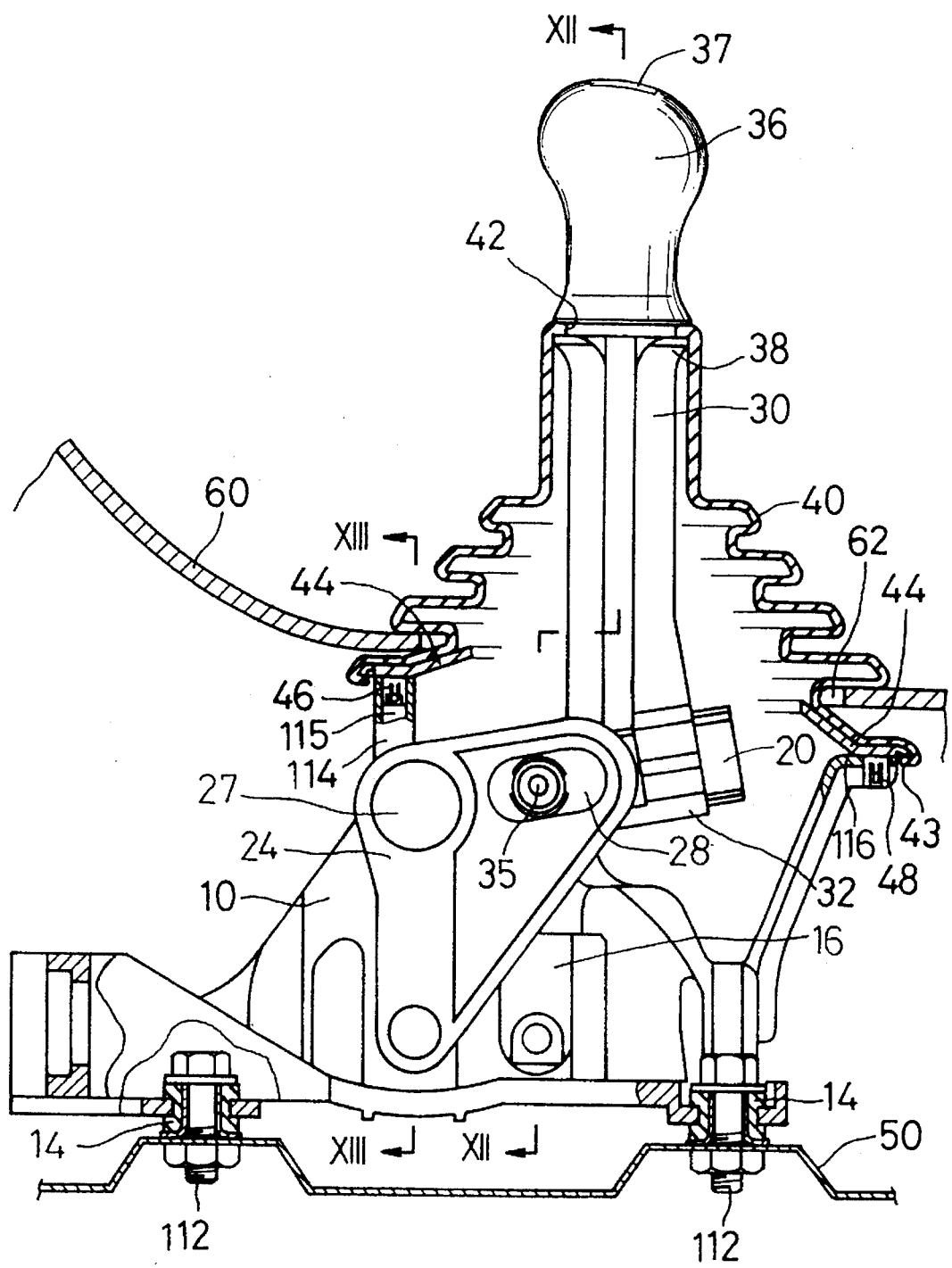
FIG. 11 is a sectional view showing the shift lever assembly of the second embodiment.

FIG. 10 is a perspective view showing a shift lever assembly for a manual transmission according to the second embodiment. FIG. 11 is a sectional view showing the same shift lever assembly. In the assembly as shown, again a shift lever 30 is assembled for shifting and selecting operations to a lever retainer 10. As shown in FIG. 11, the lever retainer 10 is mounted by bolts 12 via vibration-proof bushes 13 on a floor 50 of a vehicle.

The lever retainer 10 has two integral stays 114 which are formed on the top on the front side and which have respective mounting holes 115, and also a plate-like integral stay 116 formed on the rear side. The plate-like stay 116 has its top formed with two mounting holes 117.

The lever retainer 10 and a portion peripheral thereto are covered by a center console 60 mounted on the floor 50. The shift lever 30 projects upward through a hole or opening 62 formed in the center console 60, and has an integral lever knob 36 at its end. Between the shift lever 30 and the lower end surface of the lever knob 36, an integral boot stopper 38 is formed to provide a predetermined gap between the two components. The boot stopper 38 can receive a small open end 42 of a lever boot 40 to be described later. Between the boot stopper 38 and the lower end surface of the lever knob 36, an annular groove is defined. The annular groove has a width corresponding to the thickness of the small open end 42 of the lever boot 40.

As clearly shown in FIG. 10, the lever knob 36 is provided with a shift pattern 37 of the shift lever 30.

Now, the construction to support the shift lever 30 on the lever retainer 10 will be briefly described.

Figure 12:
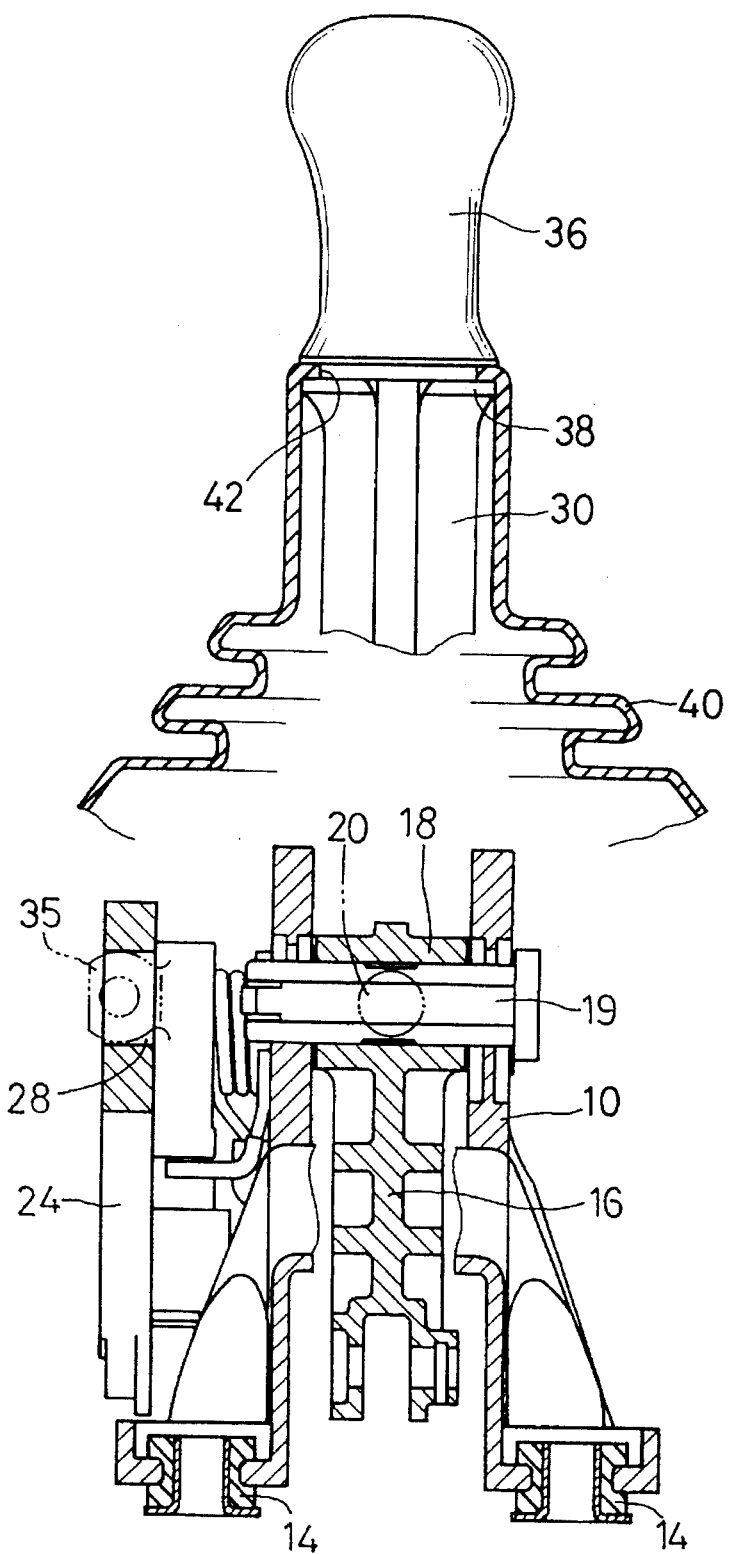
FIG. 12 is a sectional view taken along line XII—XII in FIG. 11.
Figure 13:
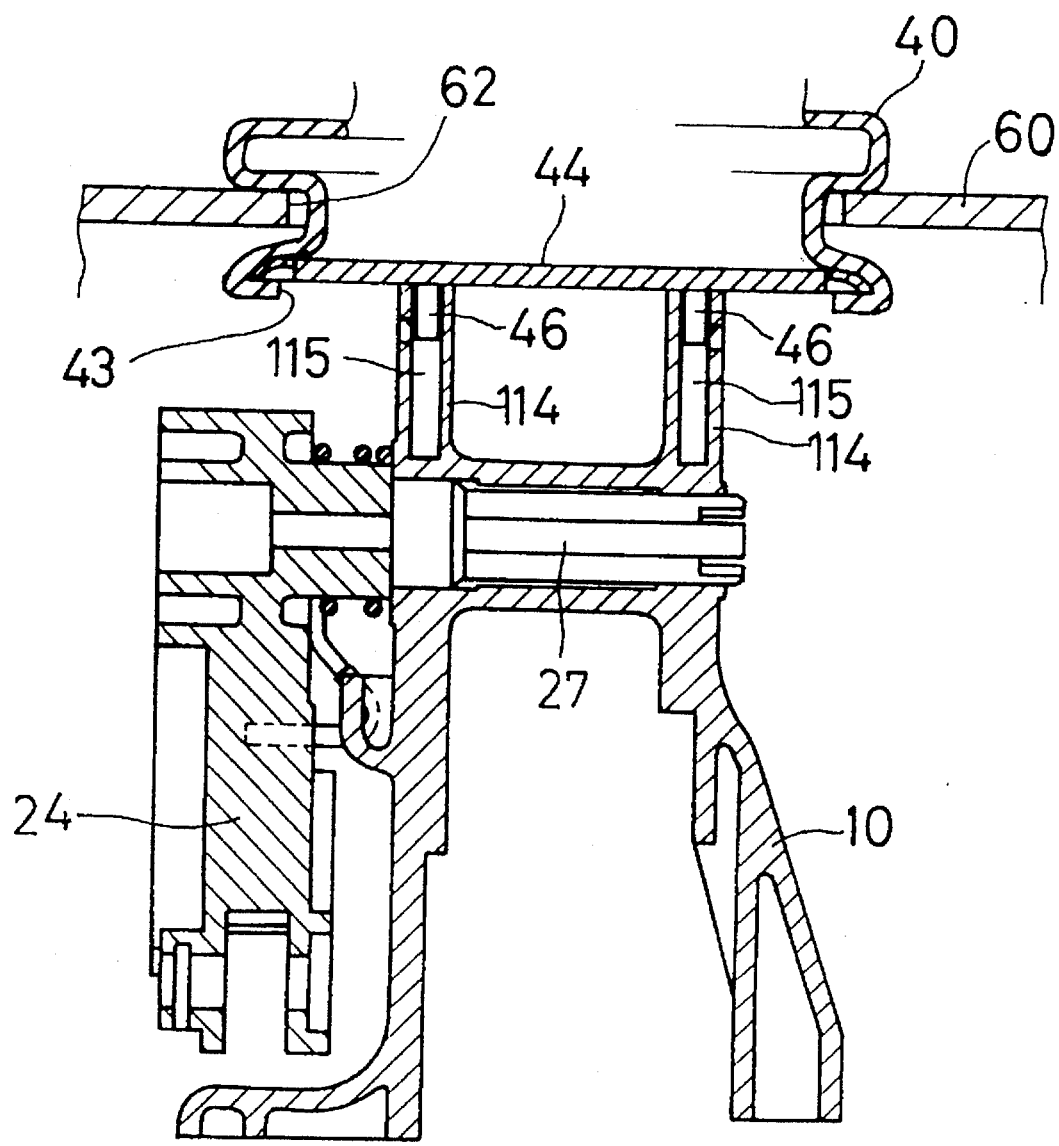
FIG. 13 is a sectional view taken along line XIII—XIII in FIG. 11.

FIG. 12 is a sectional view taken along line XII—XII in FIG. 11. FIG. 13 is a sectional view taken along line XIII—XIII in FIG. 11. As shown in FIG. 12, a boss 18 at the upper end of a shifting lever 16 is supported for rotation by a shift shaft 19 on the lever retainer 10. As shown in FIGS. 10 and 11, the boss 18 is integral or made integral with a select shaft 20 extending substantially at right angles to the shift shaft 19. The shift lever 30 has a lower end boss 32 which is supported for rotation on the select shaft 20.

As shown in FIGS. 10 to 13, substantially a mid-way portion of a selecting lever 24 is supported for rotation by a support shaft 27 on the lever retainer 10. As shown in FIGS. 10 and 11, the selecting lever 24 has a portion extending rearward from its supported position. This portion has a hole or opening 28. Engaged with the surface of the opening 28 is a ball portion 35 at an end of an L-shaped select arm 34 which is integral with the boss 32 of the shift lever 30.

With rotating operation (i.e., shifting operation) of the shift lever 30 together with the shifting lever 16 about the axis of the shift shaft 19, a shifting operation force is transmitted via a shifting cable (not shown) coupled to the lower end of the shifting lever 16 to the transmission. On the other hand, with rotating operation (i.e., selecting operation) of the shift lever 30 about the axis of the select shaft 20, the selecting lever 24 is rotated about the axis of the support shaft 27 in an interlocked relation to movement of the select arm 34 and the end ball portion 35 thereof. As a result, a selecting operation force is transmitted via a selecting cable (not shown) which is coupled to the lower end of the lower portion of the selecting lever 24 extending downward from the supported position thereof to the transmission.

The lever boot 40 is constructed as shown in FIGS. 10 and 11. As is well known in the art, the lever boot 40 is made of rubber or like elastic material and has a small upper open end 42 and a large lower open end 43. The small open end 42 of the lever boot 40 is coupled to the shift lever 30 in the annular groove defined between the lever knob 36 and the boot stopper 38.

As shown in FIGS. 11 and 13, a boot frame 44 is secured by means of bonding to the inner periphery of the large open end 43. The bottom surface of the boot frame 44 has integral mounting portions 46 and 48 which can be inserted in the mounting holes 115 and 117 of the front and rear side stays 114 and 116 of the lever retainer 10.

Figure 14A:
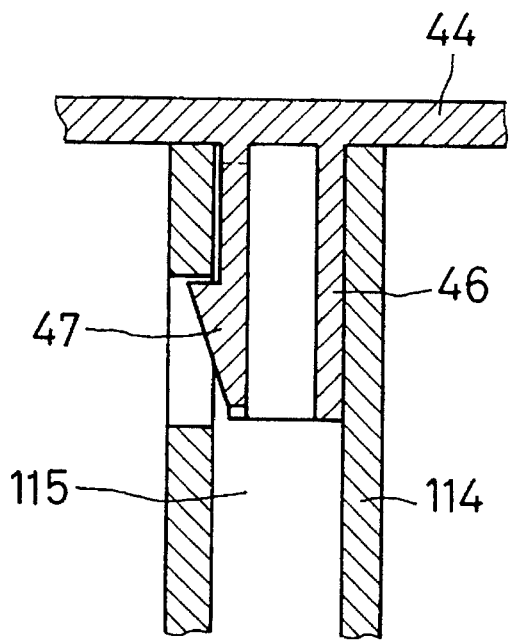
FIGS. 14(A) and 14(B) are enlarged-scale sectional views showing the status in which mounting portions are inserted in mounting holes of stays.
Figure 14B:
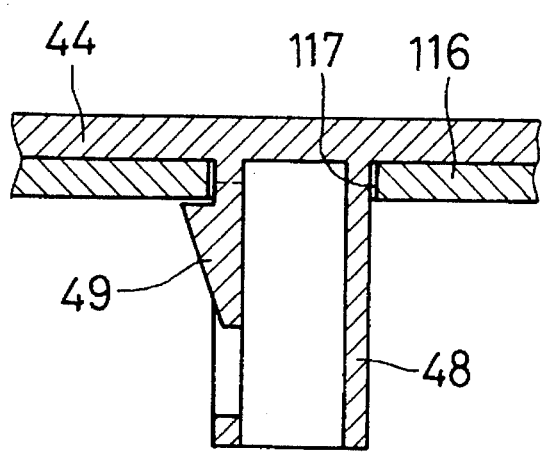

The mounting portions 46 and 48 are inserted in the mounting holes 115 and 117 of the stays 114 and 116 as shown in FIGS. 14(A) and 14(B). The mounting portions 46 and 48 have respective pawls 47 and 49 formed on one side. By inserting the mounting portions 46 and 48 into the mounting holes 115 and 117, the pawls 47 and 49 are click engaged with the stays 114 and 116. In this way, the large open end 43 of the lever boot 40 is coupled to the lever retainer 10.

Now, the procedure of assembling the shift lever assembly having the above construction will be described.

First, the lever boot 40 is fitted on the shift lever 30 from above the lever knob 36 thereof. The lever knob 36 has a dimension such that it can be inserted through the small open end 42 by making use of elastic deformation of the lever boot 40. After the lever knob 36 has been inserted through it, the small open end 42 is received by the boot stopper 38 so that it is coupled to the shift lever 30 as described above.

The large open end 43 of the lever boot 40 is coupled to the lever retainer 10 by inserting the mounting members 46 and 48 of the boot frame 44 in the mounting holes 115 and 117 of the stays 114 and 116 of the lever retainer 10. It is possible to form the mounting portions 46 and 48 directly on the bottom surface of the large open end 43 depending on the material of the lever boot 40.

Subsequent to the above coupling operation, as shown in FIG. 11, the lever retainer 10 is mounted by bolts 12 on the floor 50 of the vehicle, and also the center console 60 is mounted on the floor 50 such that the lever boot 40 is located in the opening 62. Thus, the assembling of the lever shift assembly is completed.

In the above embodiment, it may be difficult, depending on the shape and size of the lever knob 36, to insert the lever knob 36 through the small open end 42 of the lever boot 40. In such a case, like the prior art, the lever knob 36 may be formed as a separate member from the shift lever 30 and secured to the same after the lever boot 40 has been mounted on the shift lever 30.

Thus, it is possible to have the lever boot 40 mounted in advance on the side of the shift lever 30 and the lever retainer 10 and then have the shift lever 30 secured to the lever knob 36, although doing so involves an extra step of securing the lever knob 36 to the shift lever 30. In other words, in this case, the assembling operation is completed by merely mounting the center console 60 on the floor 50 after the lever retainer 10 has been mounted thereon. So far as this respect is concerned, this case is the same as the case in which the lever knob 36 and the shift lever 30 are provided as an integral member.

In the embodiment as described, the lever boot may be mounted in advance on the shift lever and the lever retainer independently of the center console. It is thus possible to simplify subsequent operation in a vehicle assembling line or the like. In addition, it is possible to provide a common center console for a manual transmission shift lever assembly and an automatic transmission shift lever assembly.

Further, where the lever knob is formed integrally with the shift lever, a step of coupling together the two components and also such consideration as accurately aligning the orientation of the knob to that of the shift lever are unnecessary, thus reducing time required for the assembling of the shift lever.

Figure 15:
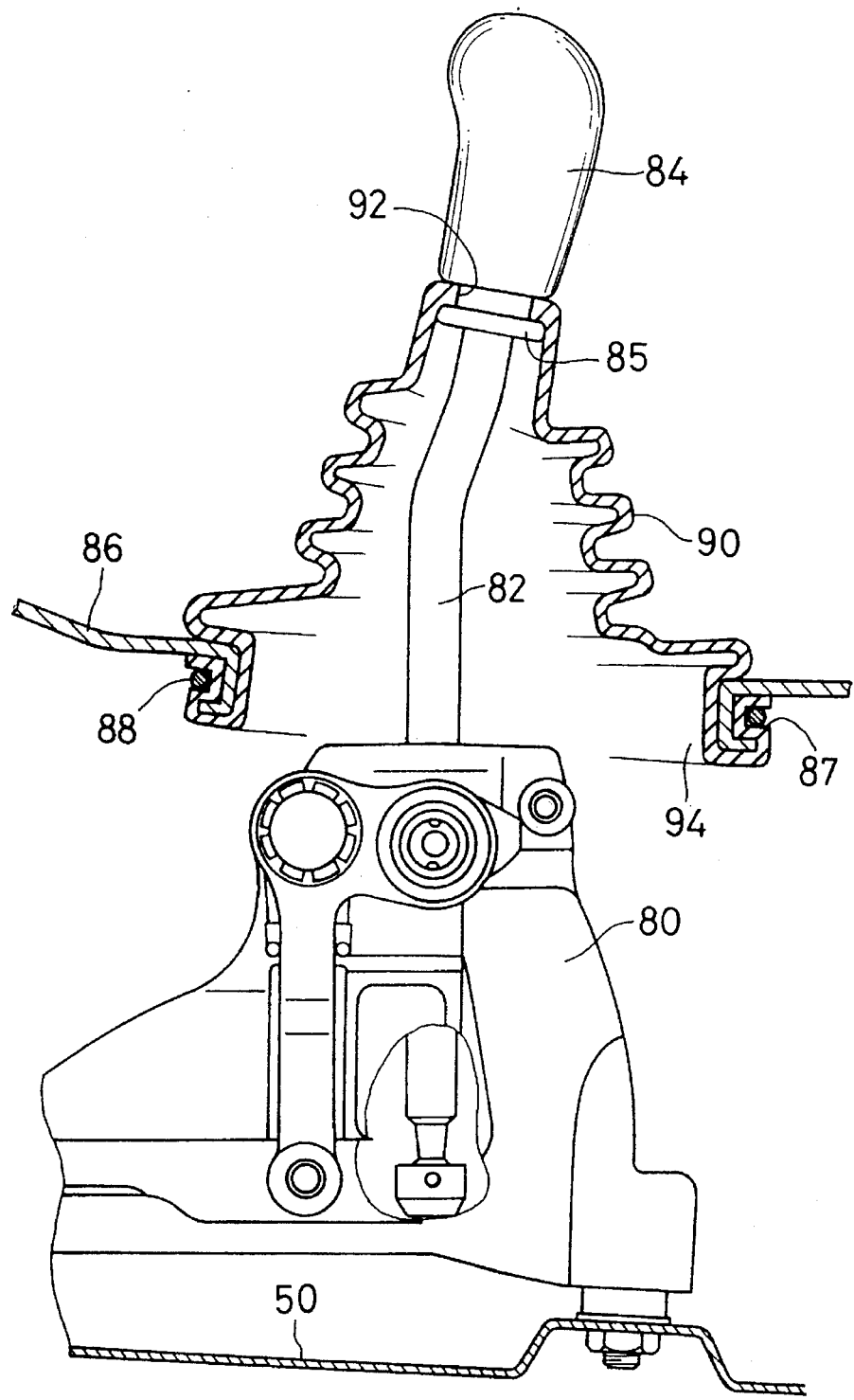
FIG. 15 is a view showing a prior art construction to mount a lever boot.

FIG. 15 shows a prior art construction to mount a lever boot.

As shown in FIG. 15, in this type of shift lever assembly, a shift lever 82 is mounted for shifting and selecting operations on a lever retainer 80 mounted on a vehicle floor 50. This shift lever 82 projects upward through an opening formed in a center console 86 provided on the floor 50, and a lever knob 84 is mounted on the end of the shift lever 82.

Further, the space between the shift lever 82 and the edge of the center console opening through which the shift lever 82 projects is covered by a lever boot 90. The upper small open end 92 of the lever boot 90 is coupled to the shift lever 82 such that it is clamped between a boot stopper 85 of the shift lever 82 and the lever knob 84. The lower large open end 94 is secured by a clip 88 to a groove 87 which is formed along the edge of the opening of the center console 86.

The assembling of this prior art shift lever assembly should inevitably follow a procedure that, after assembling the lever retainer 80 and the center console 86 on the floor 50, the small open end 92 of the lever boot 90 is fitted on the shift lever 82 from above the end thereof before the mounting of the lever knob 84, and that the large open end 94 of the lever boot 90 is coupled to the groove 87 of the center console 86. In other words, the lever boot 90 can be mounted only after the center console 86 has been mounted on the floor 50. Therefore, it has been inevitable to assemble the lever boot 90 in a vehicle assembling line or the like.

Meanwhile, the center console 86 requires the groove 87 or the like for coupling the large open end 94 of the lever boot 90. It is therefore difficult to use the center console 86 also as an automatic transmission shift lever assembly as well.

Further, the lever knob 84 is mounted by screwing on the end of the shift lever 82 after the mounting of the lever boot 90, while its upper end usually has a shift pattern display. Therefore, it is required to match the orientations of the lever knob 84 and the shift lever 82. The time required for this operation can not be ignored.

While some preferred embodiments of the invention have been described before, it is to be understood that various changes and modifications may be made in the details of design without departing from the scope and spirit of the invention.

What is claimed is:

1. A shift lever assembly for a manual transmission, comprising a lever retainer, a shifting lever having a boss supported for rotation by a shift shaft with respect to said lever retainer, a selecting lever having a boss supported for rotation by a support shaft parallel to said shift shaft with respect to said lever retainer, and a shift lever having a boss supported for selecting operation about a select shaft at right angles to said shift shaft with respect to said shifting lever, the selecting operation of said shift lever being transmitted via a select arm and an end ball portion thereof to an engagement portion of said selecting lever to cause rotation of said selecting lever about the axis of said support shaft, wherein said shift lever is formed integrally with its boss, said select arm and said ball portion.

2. The shift lever assembly according to claim 1, further comprising a lever boot having an upper small open end coupled to said shift lever and a lower large open end coupled to said lever retainer.

3. The shift lever assembly according to claim 2, wherein said shift lever is formed integrally with a lever knob and with a boot stopper for receiving the small open end of said lever boot, said lever knob being sized such that it can be inserted through the small open end by making use of elastic deformation of said lever boot.

4. A shift lever assembly for a manual transmission, comprising a lever retainer, a shifting lever having a boss supported for rotation by a shift shaft with respect to said lever retainer, a selecting lever having a boss supported for rotation by a support shaft parallel to said shift shaft with respect to said lever retainer, and a shift lever having a boss supported for selecting operation about a select shaft at right angles to said shift shaft with respect to said shifting lever, the selecting operation of said shift lever being transmitted via a select arm and an end ball portion thereof to an engagement portion of said selecting lever to cause rotation of said selecting lever about the axis of said support shaft, wherein said shifting lever is formed integrally with its boss and also with said select shaft.

5. The shift lever assembly according to claim 4, further comprising a lever boot having an upper small open end coupled to said shift lever and a lower large open end coupled to said lever retainer.

6. The shift lever assembly according to claim 4, wherein said shift lever is formed integrally with a lever knob and also with a boot stopper for receiving the small open end of said lever boot, said lever knob being sized such that it can be inserted through the small open end by making use of elastic deformation of said lever boot.

7. A shift lever assembly for a manual transmission, comprising a lever retainer, a shifting lever having a boss supported for rotation by a shift shaft with respect to said lever retainer, a selecting lever having a boss supported for rotation by a support shaft parallel to said shift shaft with respect to said lever retainer, and a shift lever having a boss supported for selecting operation about a select shaft at right angles to said shift shaft with respect to said shifting lever, the selecting operation of said shift lever being transmitted via a select arm and an end ball portion thereof to an engagement portion of said selecting lever to cause rotation of said selecting lever about the axis of said support shaft, wherein said selecting lever is formed integrally with its boss, said support shaft and said engagement portion.

8. The shift lever assembly according to claim 7, further comprising a lever boot having an upper small open end coupled to said shift lever and a lower large open end coupled to said lever retainer.

9. The shift lever assembly according to claim 7, wherein said shift lever is formed integrally with a lever knob and also with a boot stopper for receiving the small open end of said lever boot, said lever knob being sized such that it can be inserted through the small open end by making use of elastic deformation of said lever boot.

\* \* \* \* \*